D. M. GRIFFITH.

Improvement in Bee-Hives.

No. 115,843. Patented June 13, 1871.

Witnesses:
James L. Norris.
W. H. Fincke.

Inventor:
D. M. Griffith
by Diedersheim & Harris
Attys.

UNITED STATES PATENT OFFICE.

DANIEL M. GRIFFITH, OF ALUM BANK, PENNSYLVANIA.

IMPROVEMENT IN BEE-HIVES.

Specification forming part of Letters Patent No. 115,843, dated June 13, 1871.

*To all whom it may concern:*

Be it known that I, DANIEL M. GRIFFITH, of Alum Bank, county of Bedford and State of Pennsylvania, have invented certain new and useful Improvements in Bee-Hives, of which the following is a specification:

My invention relates to an improved construction of hives for bees; and has for its object to facilitate the cleansing of the hive by the bees by so constructing the bottom board that it will be upon an incline, causing moths, worms, refuse, and dirt to roll out at the opening, as more fully hereafter shown. It has for its further object to enable the bees to be removed from the hive by means of a large side door, whereby the entire hive is laid open, thus obviating the danger of injuring the bees by the process of removal. It has also for its further object a more perfect ventilation of the hive and a more perfect regulation of the temperature thereof, as will hereinafter more fully appear.

Figure 1:
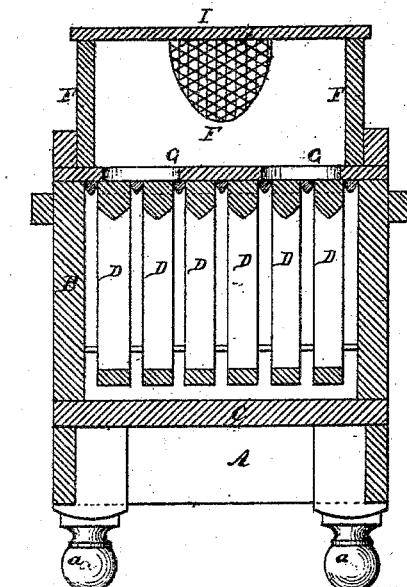
Figure 2:
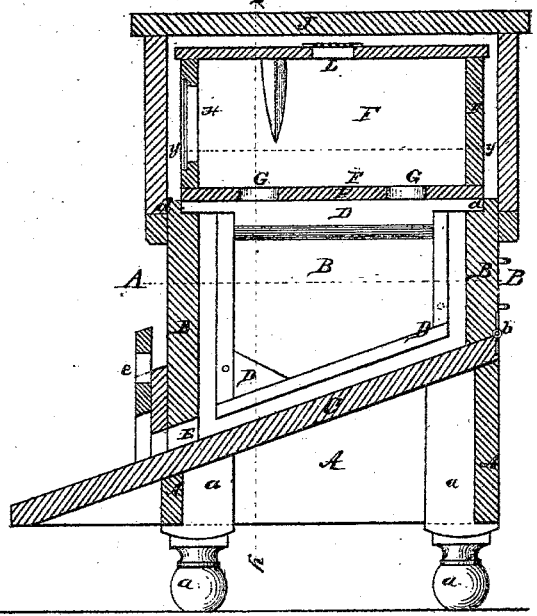
Figure 3:
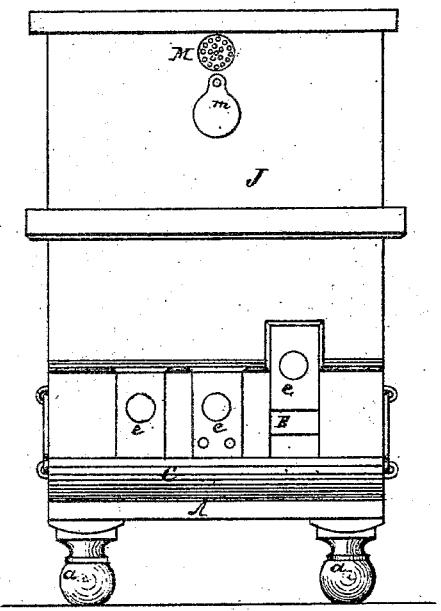
Figure 4:
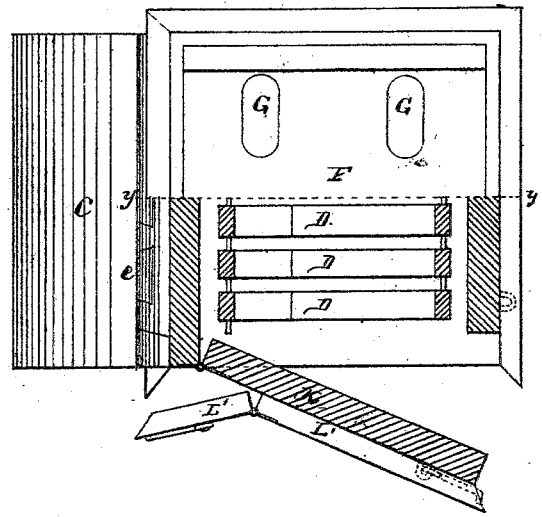

In the accompanying drawing, which, with the letters and figures marked thereon, forms part of this specification, Figure 1 represents a vertical cross-section of a hive constructed according to my plan with the cap or cover removed. Fig. 2 represents a vertical section from front to rear of same with cap or cover adjusted to its place. Fig. 3 represents a front elevation of the same with cap or cover in its place. Fig. 4 represents a horizontal section, partly upon the line A B of Fig. 2 and partly upon the line *y y* of the same figure. The side door is represented as partly opened.

General Description.

In the drawing, A represents a square frame or box, composed of four sides and four legs or corner-pieces, *a a*. This frame declines from rear to front at top so as to form an inclined plane, upon which rests the bottom of the hive C. Said bottom extends somewhat to the front of the hive and forms a shelf or step, upon which the bees may alight before entering. To the rear and upper edge of the bottom C is hinged, by the hinges *b*, the body B of the hive, which is open at top and bottom, and which is so constructed as that the top is horizontal while the bottom fits the inclined piece C so as to make a weather-close joint. Openings for the ingress and egress of the bees are provided at E and furnished with sliding doors *e*. The body of the hive is provided with a number of comb-frames, D D, suspended from a ledge, *d*, and swinging entirely clear from sides and bottom of the hive and from one another. The lower parts of said frames are made inclined to conform to the incline of bottom C. F is a rectangular box or swarm-catcher, pierced at bottom by the oblong openings G G and at the top by the ventilator L, and furnished in front with a glass-covered opening, H. J is an outside cover or protector, which fits over the honey-cap or swarm-catcher, large enough to leave a space on every side, as will be clearly seen in Fig. 2. When it is desired to warm the bees in winter by the sun's rays, this cover is tilted back until the glass windows H are exposed. When this cover is placed over the swarm-catcher, the space between it and the said catcher, being filled with air, acts as a non-conducter, thus keeping the hive warm in cold weather and cool in warm weather. An entire side, K, of the hive above the part A is hinged with good substantial hinges so that it may be swung open. The parts L' L' represent the outer sheathing of the hive, which is broken by a hinge so that the beveled corners will not interfere with the opening of the part K. The front part of the hive is also hung on hinges (not shown) so as to open and shut, and by means of these commodious door-ways the interior of the comb-hive or part B, in which the young are reared, may be thoroughly and conveniently inspected, and a young swarm may be easily taken out, along with its queen or mother-bee, without the inconvenience and danger of loss which attends the ordinary mode of removing or hiving a swarm.

It will be readily seen that a hive made after my plan will always have a thorough upward ventilation. In my hive the pure air enters at the lower opening E and passes upward around and between the comb-frame D, through the openings G G in the honey-cap, thence upward through the ventilator I in the top of the honey-cap or swarm-catcher, and, finally, out at the perforated plate M in front of the protecting-cover. This ventilation may be regulated or entirely shut off by the sliding doors *e* and cover *m*, as will be readily understood upon reference to Fig. 3.

When it is desired to examine and cleanse the hive more thoroughly than can be readily done through the door K, it is only necessary to tilt the hive back upon its hinge b when the whole surface of the bottom C will be exposed and may be easily and perfectly cleansed from all foulness.

I am aware that the several parts which compose my hive are old, in themselves considered; therefore I do not claim them individually; but

What I claim as new, and desire to secure by Letters Patent, is—

The arrangement of the part A, inclined bottom C, hinged body B provided with the openings E and doors e, the honey-cap F having the openings G G and L, the comb-frames D, and the removable cover J with opening M and plate m, all arranged and operating substantially as and for the purpose set forth.

To the above I have signed my name this 30th day of June, 1870.

DANIEL M. GRIFFITH.

Witnesses:
 GARDEN HAMMER,
 THOMAS G. WALKER.